United States Patent
Tarozzi et al.

(10) Patent No.: US 12,475,345 B2
(45) Date of Patent: Nov. 18, 2025

(54) COMPUTER-IMPLEMENTATED METHOD FOR INKJET PRINTING AND RELATED EQUIPMENT

(71) Applicant: PROJECTA ENGINEERING SRL, Fiorano Modenese (IT)

(72) Inventors: Fabio Tarozzi, Fiorano Modenese (IT); Michele Muzzarelli, Fiorano Modenese (IT)

(73) Assignee: PROJECTA ENGINEERING SRL, Fiorano Modenese (IT)

( * ) Notice: Subject to any disclaimer, the term of this patent is extended or adjusted under 35 U.S.C. 154(b) by 0 days.

(21) Appl. No.: 18/269,194

(22) PCT Filed: Dec. 22, 2021

(86) PCT No.: PCT/IB2021/062174
§ 371 (c)(1),
(2) Date: Jun. 22, 2023

(87) PCT Pub. No.: WO2022/137155
PCT Pub. Date: Jun. 30, 2022

(65) Prior Publication Data
US 2024/0135127 A1   Apr. 25, 2024
US 2024/0232555 A9   Jul. 11, 2024

(30) Foreign Application Priority Data
Dec. 23, 2020 (IT) .................. 102020000032066

(51) Int. Cl.
B41J 2/045     (2006.01)
B41J 2/145     (2006.01)
(Continued)

(52) U.S. Cl.
CPC ............ G06K 15/105 (2013.01); B41J 2/145 (2013.01); B41J 3/407 (2013.01); B41J 3/543 (2013.01); G06K 15/021 (2013.01)

(58) Field of Classification Search
CPC .... B41J 2/04505; B41J 2/2135; B41J 2/2146; B41J 2203/01; B41J 2203/00; B41J 2203/011; B41J 29/393; B41J 29/38
See application file for complete search history.

(56) References Cited

U.S. PATENT DOCUMENTS 8,040,534 B2     10/2011  Yoneoka
2006/0082814 A1*  4/2006  Gardner ............... G06K 15/021
                                                          358/1.15
(Continued)

FOREIGN PATENT DOCUMENTS

ES      2376679 A1 *  3/2012
ES      2376679 B1     1/2013
WO  2006044599 A2     4/2006

OTHER PUBLICATIONS

Lopez, MachineTranslationofES2376679 A1, 2012 (Year: 2012).*

*Primary Examiner* — Scott A Richmond
(74) *Attorney, Agent, or Firm* — Dykema Gossett PLLC

(57) ABSTRACT

The method for inkjet printing, comprises at least the following phases of: providing at least one inkjet printing device provided with a plurality of print heads and provided with a plurality of dedicated processing and control units, each of which is operatively connected to at least one related print head; providing at least one manufactured article to be decorated (M1) having an exposed surface (Ma); movement of the manufactured article to be decorated (M1) with respect to the printing device along a direction of forward movement; providing a final image (F) in digital format to be applied on the exposed surface (Ma); decomposition of the final image (F) into a plurality of decorative portions (P);

(Continued)

sending each of the decorative portions (P) in digital format to a related dedicated processing and control unit; application of each of the decorative portions (P) on the exposed surface (Ma) by means of the print heads operated by the dedicated processing and control units so as to obtain a decorated manufactured article (M2) with the final image (F).

12 Claims, 3 Drawing Sheets

(51) Int. Cl.
  *B41J 3/407* (2006.01)
  *B41J 3/54* (2006.01)
  *G06K 15/02* (2006.01)
  *G06K 15/10* (2006.01)

(56) References Cited

U.S. PATENT DOCUMENTS

2016/0155030 A1 6/2016 Blank et al.
2020/0338910 A1* 10/2020 Sawada ............... B41J 11/0065

* cited by examiner

COMPUTER-IMPLEMENTATED METHOD FOR INKJET PRINTING AND RELATED EQUIPMENT

CROSS-REFERENCE TO RELATED APPLICATION

This application is a national stage filing based upon International application No. PCT/IB2021/062174, filed 22 Dec. 2021, which claims the benefit of priority to Italy application No. 102020000032066 filed 23 Dec. 2020.

TECHNICAL FIELD

The present invention relates to a computer-implemented method for inkjet printing and related equipment.

BACKGROUND ART

Today, in the ceramic sector, but not only (think e.g. of printing on glass, wood, fabric or metal), the use of digital inkjet printers is widespread.

This type of printer comprises a supporting surface of a manufactured article to be decorated, which is movable along a direction of forward movement, and one or more print heads formed by a plurality of nozzles, which emit controlled jets of micro-drops of ink, taken from a tank or a cartridge.

The print heads are controlled by an electronic processor which gives a succession of printing commands to the various nozzles, depending on the image to be obtained and on the relevant position between the heads and the surface to be printed, by activating or leaving the nozzles inactive.

This printing method and its related equipment do, however, have some drawbacks.

In fact, it frequently happens that the manufactured article to be decorated is misaligned with respect to the direction of forward movement and with respect to the arrangement of the nozzles.

In other words, the median axis of the manufactured article to be decorated may be inclined with respect to the median axis of the related printer, and consequently the image obtained by means of the ink dispensed by the nozzles would be angularly offset with respect to the exposed surface of the manufactured article to be decorated.

The problem of aligning the image to be printed with the exposed surface of the manufactured article to be decorated is therefore deeply felt.

In order to overcome this drawback, various solutions have been devised over time, briefly described below.

A first solution is to use a centering device of the mechanical type, which involves the use of a mechanical element positioned upstream the printer and which is able to physically interact with the manufactured article to be decorated to rotate and/or shift it so that it is aligned with the printer itself. This solution has the drawback that the mechanical element may damage the manufactured article to be decorated, e.g. by rubbing against the edges of the same.

A second solution of known type involves the use of movable print heads, i.e. mounted on a support which can be displaced or rotated depending on the position of the exposed surface. This solution also has its drawbacks, since the movement operations of the heads are generally slow and do not ensure the required accuracy.

A third solution known at present consists in processing different versions of the same image to be printed and in choosing, each time, the one which best suits the inclination of the arriving exposed surface. This solution, however, requires the use of a computer with a very large memory and, in any case, allows the use of a limited number of images.

DESCRIPTION OF THE INVENTION

The main aim of the present invention is to devise a method and a piece of equipment for inkjet printing which allows the image to be printed to be conveniently and easily adapted to the manufactured article to be decorated regardless of the orientation thereof.

Within this arm, one object of the present invention is to enable the alignment of the image to be printed to the related exposed surface to be decorated with lower timings than those characterizing the solutions of known type, so as to obtain higher printing frequencies with respect to these solutions.

Another object of the present invention is to avoid damaging the manufactured article to be decorated during the alignment operations with respect to the image to be printed thereon.

Yet another object is to allow the image to be printed to be aligned to the related exposed surface to be decorated by means of a piece of equipment which requires the use of less sophisticated and expensive components than those of known type.

Another object of the present invention is to devise a computer-implemented method for inkjet printing and the related equipment which allow the aforementioned drawbacks of the prior art to be overcome within the scope of a simple, rational, easy and effective to use as well as affordable solution.

The objects mentioned above are achieved by the present computer-implemented method for inkjet printing according to claim 1.

BRIEF DESCRIPTION OF THE DRAWINGS

Other characteristics and advantages of the present invention will become more apparent from the description of a preferred, but not exclusive, embodiment of a method and equipment for inkjet printing, illustrated by way of an indicative, yet non-limiting example, in the accompanying tables of drawings wherein.

Embodiments of the Invention

Figure 1:
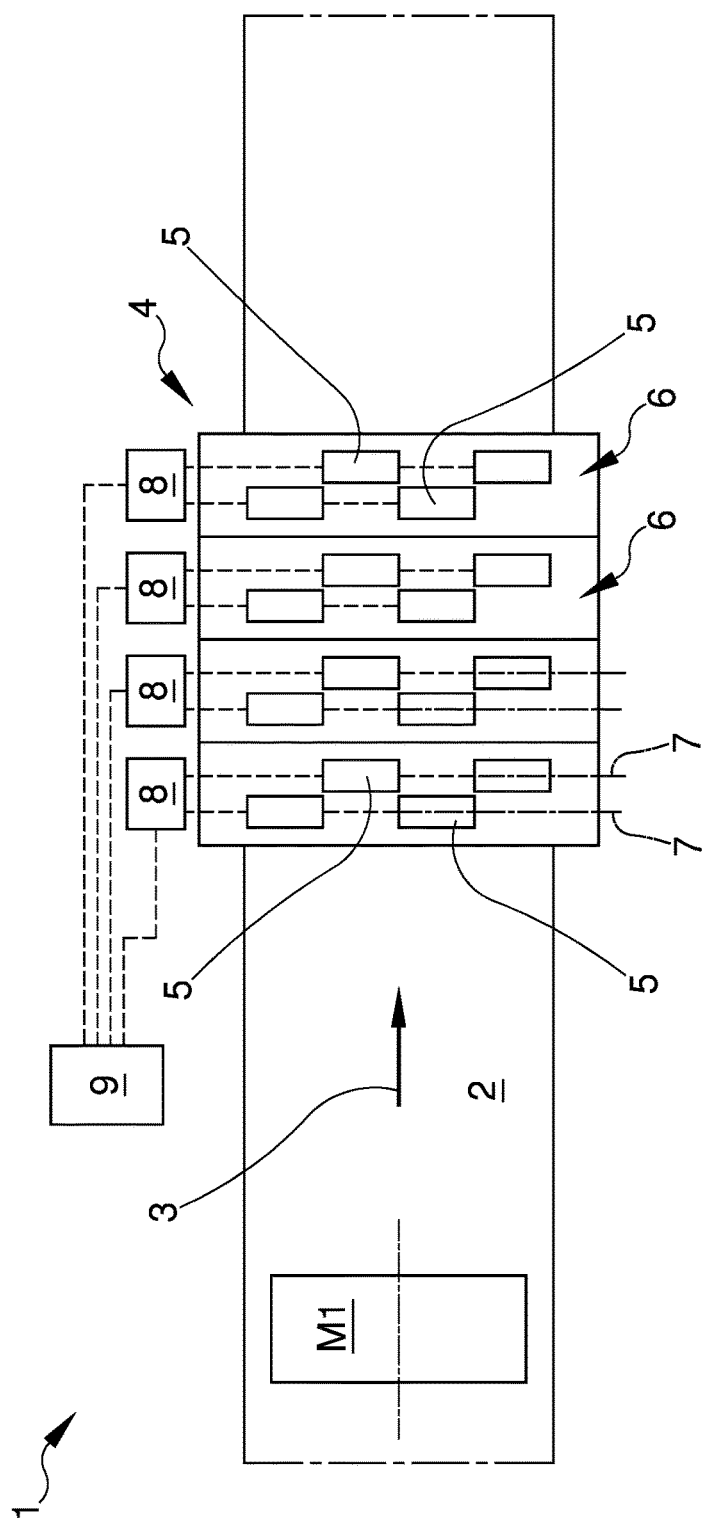
FIG. 1 is a schematic plan representation from above of a piece of equipment according to the invention.
Figure 2:
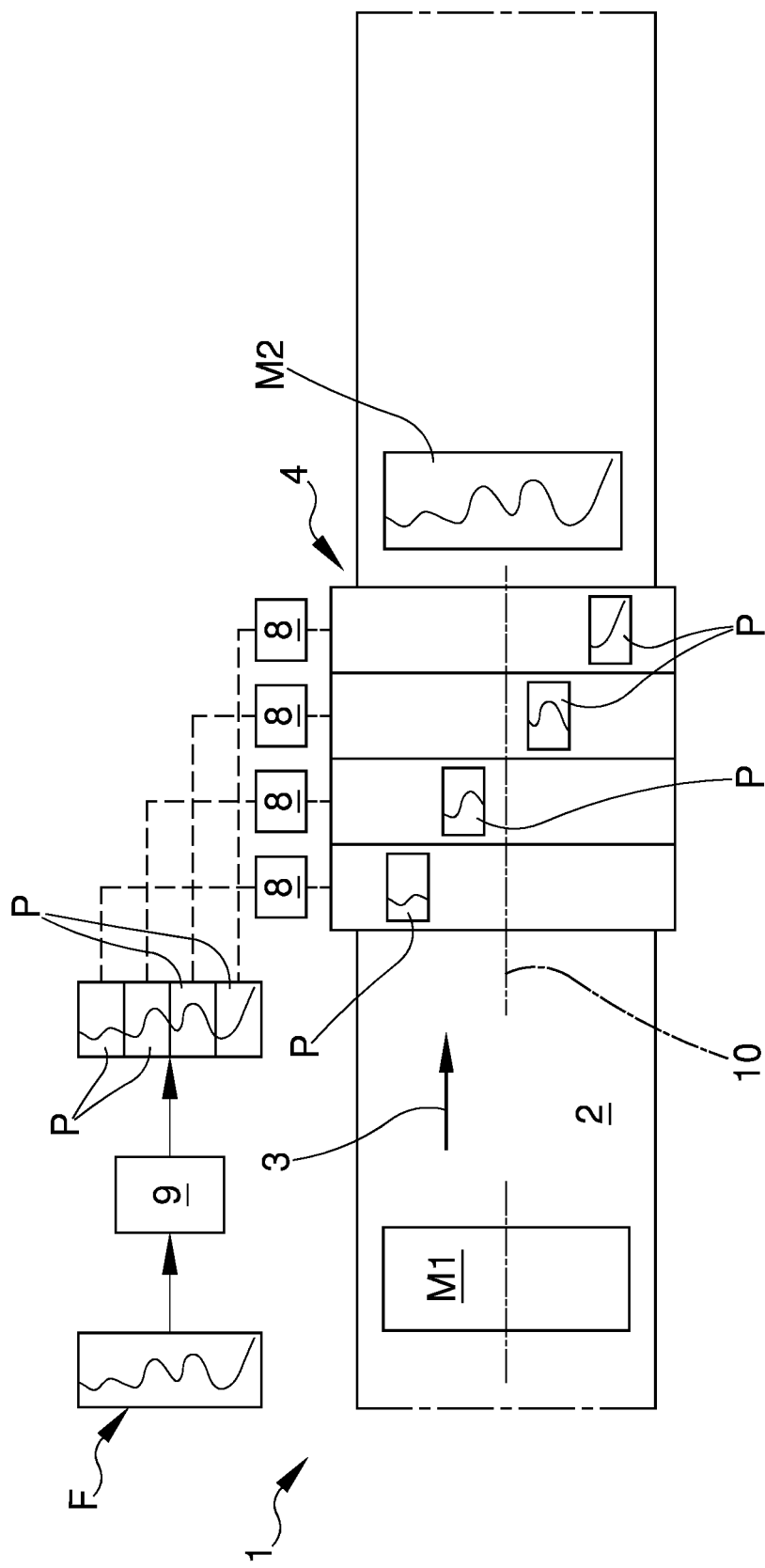
FIG. 2 is a schematic representation of the equipment in FIG. 1 in the implementation of the phases of a method according to the invention for the decoration of a manufactured article which is aligned with respect to the printing equipment.
Figure 3:
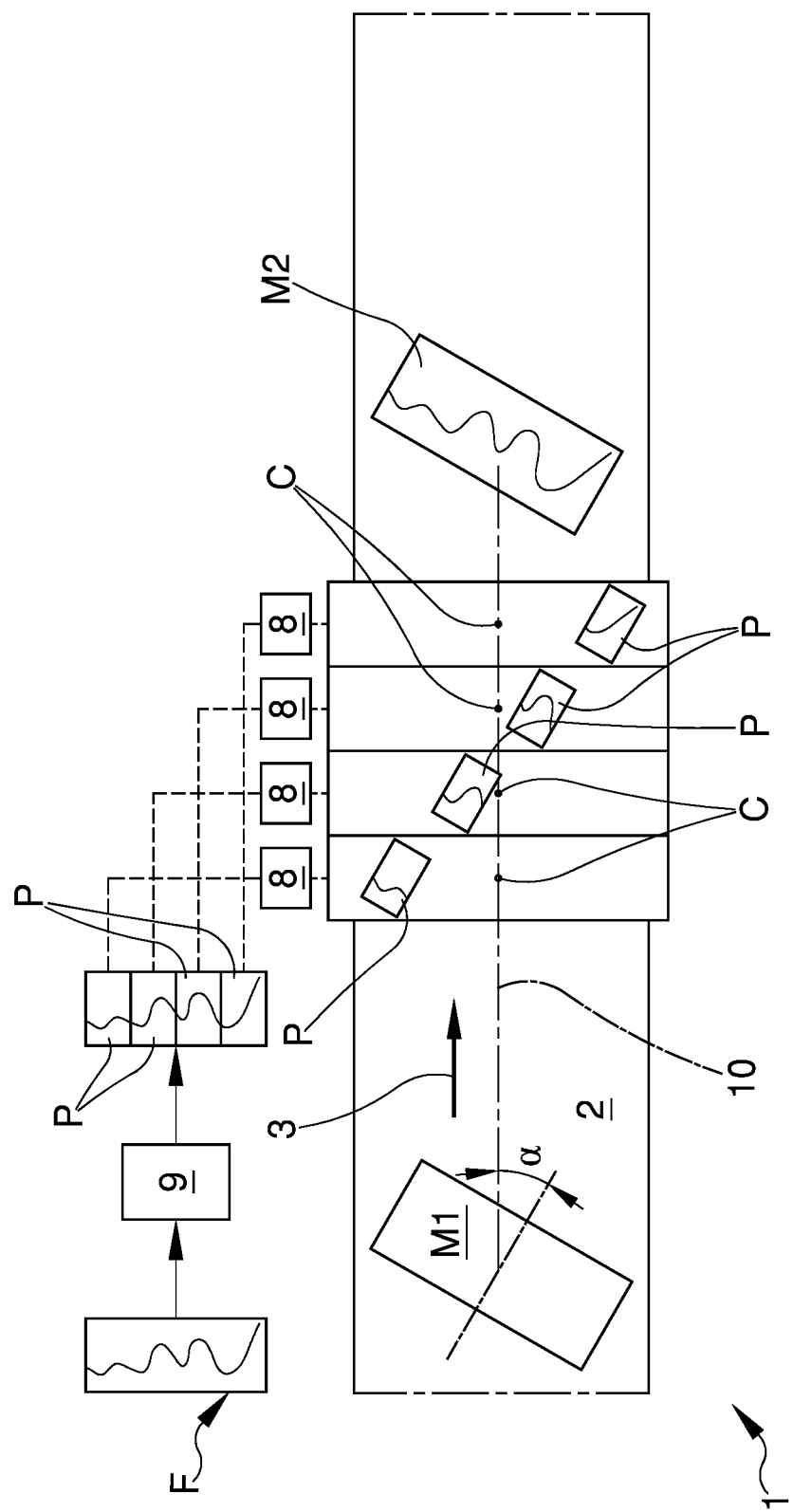
FIG. 3 is a schematic representation of the equipment in FIG. 1 in the implementation of the phases of a method according to the invention for the decoration of a manufactured article which is inclined with respect to the printing equipment.

With particular reference to such figures, reference numeral 1 globally indicates a piece of equipment for inkjet printing.

The equipment 1 comprises a basic frame, not shown in detail in the figures, at least one supporting surface 2 of at least one manufactured article to be decorated M1 having an exposed surface Ma, wherein the supporting surface 2 is associated with the basic frame and is movable along a direction of forward movement 3.

The equipment 1 then comprises a printing device 4 comprising a plurality of print heads 5, each provided with a plurality of nozzles, not visible in detail in the figures, for the dispensing of ink.

Suitably, the heads 5 are arranged on top of the supporting surface 2 in such a way that the related nozzles face the exposed surface Ma to be decorated during the passage of the manufactured article to be decorated M1 along the direction of forward movement 3.

More particularly, the equipment 1 comprises a plurality of groups 6 of heads 5, wherein each of such groups 6 comprises at least one row of heads 5 substantially (i.e., except for machining tolerances) aligned with each other along a same line of action 7. The lines of action 7 are parallel to each other and are arranged transversely with respect to the direction of forward movement 3. Advantageously, the heads 5 of each group 6 are arranged so as to be able to cover the entire supporting surface 2, transversely to the direction of forward movement 3.

In the particular embodiment shown in the figures, each group 6 comprises multiple rows of heads 5, the respective lines of action 7 of which are parallel to each other. The heads 5 of each row are staggered with respect to the heads of the adjacent row and belonging to the same group 6.

According to the invention, the equipment 1 comprises a plurality of dedicated processing and control units 8, each of which is operatively connected to at least one relevant print head 5 and is configured to control the dispensing of ink through the related nozzles.

The dedicated processing and control units 8 are mutually separate and independent.

The heads 5 controlled by each dedicated processing and control unit 8 are arranged in succession with respect to each other along the direction of forward movement 3.

Preferably, each dedicated processing and control unit 8 is operatively connected to a group 6 of heads 5 to control the dispensing of ink through the related nozzles. Therefore, the groups 6 of heads 5 controlled by each dedicated processing and control unit 8 are arranged in succession to each other along the direction of forward movement 3.

According to the invention, the equipment 1 comprises at least one main processing and control unit 9 operatively connected to the dedicated processing and control units 8 and configured to receive at input a final image F to be applied onto the exposed surface Ma, to decompose the final image F into a plurality of decorative portions P and to send at output, to the dedicated processing and control units 8, a related decorative portion P. The set of decorative portions P obtained through the decomposition performed by the main processing and control unit 9 then defines the final image F to be applied on the exposed surface Ma.

In the embodiment shown in the figures, the main processing and control unit 9 is separate from the dedicated processing and control units 8, although it cannot be ruled out that it may coincide with one of them.

The dedicated processing and control units 8 are programmed to control the related print heads 5 so as to reproduce the related decorative portions P on the exposed surface Ma. It follows, therefore, that the heads 5 controlled by each dedicated processing and control unit 8 are adapted to decorate only partly the exposed surface Ma, thereby covering a part of it with the related decorative portion P.

Advantageously, the equipment 1 comprises detection means, not shown in the figures, of the angle of inclination a of the exposed surface Ma to be decorated with respect to a preset reference position.

In the case of a manufactured article to be decorated M1 shaped substantially like a parallelogram and provided with a median axis, the preset reference position corresponds to that wherein such median axis is substantially aligned with a reference line 10, e.g. corresponding to the median axis of the groups 6 of heads 5 parallel to the direction of forward movement 3.

Preferably, to identify the angle of inclination a, the detection means detects the inclination between a reference side of the exposed surface Ma, e.g. the front forward side, and the reference line 10.

Advantageously, the dedicated processing and control units 8 are configured to rotate the related decorative portions P by an angle equal to the detected angle of inclination a, so that each decorative portion P is angularly aligned with the exposed surface Ma.

In other words, the main processing and control unit 9 receives the final image F in digital format and in a predefined reference position, decomposes the image thus received, and sends the relevant decorative portions P to the corresponding dedicated processing and control units 8. The dedicated processing and control units 8 then receive the decorative portions P in digital format and oriented in a manner consistent with the reference position of the final image F and, then, each rotate the relevant decorative portion P by an angle equal to the angle of inclination a.

In more detail, the rotation of each of the decorative portions P operated by the related dedicated processing and control unit 8 is performed around a corresponding center of rotation C. The centers of rotation C of each decorative portion P are arranged aligned with each other.

More particularly, the centers of rotation C are aligned with each other along the reference line 10.

The terms "to rotate" or "rotation", used herein with reference to the operations performed by the dedicated processing and control units 8 on the related decorative portions P, mean that the dedicated processing and control units 8 are configured to selectively identify and activate the nozzles of the related heads 5 by means of which the decorative portion P is, once applied, rotated by an angle equal to the angle of inclination a around the related center of rotation C. Therefore, it is not a physical rotation but a digital rotation of the individual decorative portions P.

The decorative portions P are therefore applied sequentially to each other on the exposed surface Ma during the displacement of the manufactured article to be decorated M1 along the direction of forward movement 3, so as to obtain, at the end of the passage below the last group 6 of heads 5, a decorated manufactured article M2 with the final image F aligned with its exposed surface Ma.

Each decorative portion P is therefore rotated around the relevant center of rotation C by an angle equal to the detected angle of inclination a and applied onto a corresponding part of the exposed surface Ma during the passage of the manufactured article to be decorated M1 below the heads 5.

The operation of the equipment 1 in implementing the method according to the invention is as follows.

The method to which the present invention relates consists in providing at least one manufactured article to be decorated M1, e.g. of the type of a slab made of a ceramic material, having an exposed surface Ma, and the movement thereof along the direction of forward movement 3 with respect to the printing device 4.

The movement of the manufactured article to be decorated M1 along the direction of forward movement 3 is performed by means of the supporting surface 2.

According to the invention, a final image F in digital format is provided to be applied on the exposed surface Ma and the final image F is then decomposed into a plurality of decorative portions P.

More particularly, the final image F is sent in digital format to the main processing and control unit 9, which is configured to perform the decomposition thereof into a predefined number of decorative portions P.

Preferably, a phase of acquisition of the dimensions of the exposed surface Ma is performed before providing the final image F, and the final image F is selected in such a way that its dimensions correspond to those of the exposed surface Ma.

Advantageously, the decomposition of the final image F is performed parallel to the direction of forward movement 3.

In more detail, the decorative portions P have the same extension with respect to each other along a direction transverse to the direction of forward movement 3. Each decorative portion P is then sent, in digital format, to the dedicated processing and control units 8.

Appropriately, the sending of the decorative portions P to the dedicated processing and control units 8 is managed by the main processing and control unit 9.

The main processing and control unit 9 receives, therefore, at input the final image F in digital format and sends at output, again in digital format, the decorative portions P to the related dedicated processing and control units 8. Preferably, the main processing and control unit 9 decomposes the final image F into a number of decorative portions P equal to the number of dedicated processing and control units 8. It cannot, however, be ruled out that the number of decorative portions P may be less than the number of dedicated processing and control units 8.

Advantageously, a phase of detection of the angle of inclination α of the exposed surface Ma is performed with respect to a preset reference position. As discussed above, the reference position of the exposed surface Ma corresponds to the position that the exposed surface Ma should have in order to receive the final image F, obtained by means of ink dispensing, without the need to perform any alignment operation between them. In other words, the preset reference position corresponds to the position in which the exposed surface Ma is substantially aligned, e.g. with a median axis thereof, to the printing device 4, that is, to a predefined reference line 10.

The reference line 10 is appropriately oriented parallel to the direction of forward movement 3.

Advantageously, subsequent to the sending of the decorative portions P to the related dedicated processing and control units 8, at least one phase of rotation is performed of each of the decorative portions P by an angle equal to the detected angle of inclination a so that each decorative portion P is angularly aligned with the exposed surface Ma.

More particularly, the rotation of each of the decorative portions P is performed around a related center of rotation C, wherein the centers of rotation C of each of the decorative portions P are aligned with each other along the reference line 10.

Finally, each of the decorative portions P is applied to the exposed surface Ma by means of the print heads 5 controlled by the dedicated processing and control units 8 so as to obtain a decorated manufactured article M2 with the final image F.

Since the groups 6 of heads 5 connected to each dedicated processing and control unit 8 are arranged in succession with respect to each other along the direction of forward movement 3, it follows that the decorative portions P are applied in sequence onto the exposed surface Ma by the relevant groups 6 of heads 5, whereby the final image F is composed as the manufactured article to be decorated M1 passes below the heads themselves along the direction of forward movement 3.

It has, in practice, been ascertained that the described invention achieves the intended objects and in particular the fact is emphasized that the method and the equipment to which the present invention relates, through the decomposition of the final image to be applied on the manufactured article to be decorated, allow obtaining a precise and accurate decoration even on large surfaces, without the need to use particularly sophisticated computers and regardless of the orientation of the manufactured article itself.

More specifically, the use of a plurality of dedicated processing and control units, each of which is configured to manage an individual decorative portion to be applied on the exposed surface, makes the decoration and rotational operations of the portion itself easier since the size of the file to be managed is considerably smaller than that of the final image as a whole.

In this way, it is possible to perform a digital rotation of the individual decorative portions to be applied on the exposed surface of the manufactured article to be decorated using computers commonly available on the market and without the need for any physical interaction with the manufactured article itself.

The invention claimed is:

1. A computer implemented method for inkjet printing, comprising:

providing at least one inkjet printing device provided with a plurality of print heads, wherein each of said print heads comprises a plurality of nozzles for the dispensing of ink, and provided with a plurality of dedicated processing and control units, each of which is operatively connected to at least one related print head and is configured to operate the dispensing of ink through the related nozzles;

providing a main processing and control unit operatively connected to said dedicated processing and control units;

providing at least one manufactured article to be decorated having an exposed surface;

movement of said manufactured article to be decorated with respect to said printing device along a direction of forward movement, said exposed surface passing below said print heads;

providing a final image in digital format to be applied on said exposed surface;

decomposition of said final image into a plurality of decorative portions;

sending each of said decorative portions in digital format to a related dedicated processing and control unit;

application of each of said decorative portions on said exposed surface by means of the print heads operated by said dedicated processing and control units so as to obtain a decorated manufactured article with said final image, wherein said decomposition is performed by means of said main processing and control unit, said main processing and control unit being configured to receive said final image as an input and to send said decorative portions as an output to said dedicated processing and control units, wherein the method further includes a phase of detection of the angle of inclination of said exposed surface with respect to a preset reference position, and includes, subsequent to said sending of the decorative portions to the relevant dedicated processing and control units, at least one phase of rotation of each of said decorative portions by an angle equal to said detected angle of inclination so that each decorative portion is angularly aligned with said exposed surface, and wherein said rotation of each of the decorative portions is performed by means of a related dedicated processing and control unit.

2. The method according to claim 1, wherein said decomposition is performed parallel to said direction of forward movement in such a way that the decorative portions have the same extension with respect to each other along a direction transverse to said direction of forward movement.

3. The method according to claim 2, wherein said decorative portions have the same extension with respect to each other along a direction transverse to said direction of forward movement.

4. The method according to claim 1, wherein the method further comprises a phase of acquisition of the dimensions of said exposed surface, the dimensions of said final image corresponding to those of said exposed surface.

5. The method according to claim 1, wherein said rotation of each of said decorative portions is performed around a relevant center of rotation, and wherein the centers of rotation of each of said decorative portions are aligned with each other along a reference line.

6. The method according to claim 5, wherein said exposed surface has at least one median axis and said reference line is substantially aligned with said median axis with said exposed surface at said preset reference position.

7. The method according to claim 6, wherein said reference line is substantially parallel to said direction of forward movement.

8. The method according to claim 1, wherein the print heads operated by each of said dedicated processing and control units are arranged in succession to each other along said direction of forward movement.

9. The method according to claim 8, wherein application of each of said decorative portions is performed sequentially during the displacement of said manufactured article to be decorated along said direction of forward movement.

10. A system for inkjet printing comprising:
a frame;
at least one supporting surface of at least one manufactured article to be decorated having an exposed surface, wherein said supporting surface is associated with said frame and is movable along a direction of forward movement;
a printing device comprising a plurality of print heads, each provided with a plurality of nozzles for dispensing ink; wherein the printing device includes:
a plurality of dedicated processing and control units, each of which is operatively connected to at least one relevant print head and is configured to operate the dispensing of ink through the related nozzles,
at least one main processing and control unit operatively connected to said dedicated processing and control units and configured to:
receive as an input a final image to be applied onto said exposed surface,
decompose said final image into a plurality of decorative portions, and
send a related decorative portion as an output to said dedicated processing and control units, wherein said dedicated processing and control units are programmed to operate the related print heads so as to reproduce the related decorative portions on said exposed surface, wherein the system further includes detection means of the angle of inclination of the exposed surface to be decorated with respect to a preset reference position, and wherein said dedicated processing and control units are operatively connected to said detection means and are configured to rotate the relevant decorative portions by an angle equal to said detected angle of inclination so that each decorative portion is angularly aligned with said exposed surface during the passage thereof at the point where the relevant print heads are located.

11. The system according to claim 10, wherein the print heads controlled by each of said dedicated processing and control units are arranged in succession along said direction of forward movement, said decorative portions being applied to each other in sequence onto said exposed surface during the displacement of said manufactured article to be decorated along said direction of forward movement.

12. The system according to claim 10, wherein said rotation of each of said decorative portions is performed around a relevant center of rotation, where the centers of rotation of each of said decorative portions are aligned with each other along a predefined reference line.

* * * * *